US011267960B2

(12) United States Patent
Cartier et al.

(10) Patent No.: US 11,267,960 B2
(45) Date of Patent: Mar. 8, 2022

(54) IMPERVIOUS BREATHABLE ETHYLENE COPOLYMER FILM

(75) Inventors: Laurent B. Cartier, Wayne, PA (US); Stéphane Bizet, Barc (FR)

(73) Assignee: SK GLOBAL CHEMICAL CO., LTD., Seoul (KR)

( * ) Notice: Subject to any disclaimer, the term of this patent is extended or adjusted under 35 U.S.C. 154(b) by 61 days.

(21) Appl. No.: 13/639,136

(22) PCT Filed: Apr. 4, 2011

(86) PCT No.: PCT/FR2011/050753
§ 371 (c)(1),
(2), (4) Date: Oct. 23, 2012

(87) PCT Pub. No.: WO2011/128554
PCT Pub. Date: Oct. 20, 2011

(65) Prior Publication Data
US 2013/0034716 A1 Feb. 7, 2013

(30) Foreign Application Priority Data
Apr. 14, 2010 (FR) ...................... 1052846

(51) Int. Cl.
| B32B 27/12 | (2006.01) |
| B32B 27/08 | (2006.01) |
| C08L 23/08 | (2006.01) |
| C08J 5/18 | (2006.01) |

(52) U.S. Cl.
CPC ............. *C08L 23/0869* (2013.01); *C08J 5/18* (2013.01); *C08L 23/0853* (2013.01); *C08J 2323/08* (2013.01); *Y10T 428/264* (2015.01); *Y10T 442/2164* (2015.04)

(58) Field of Classification Search
CPC .......... C08J 5/18; C08J 23/0815; C08J 7/047; B32B 27/08; B32B 27/32; B32B 27/00; B32B 15/08; B32B 5/26; B32B 17/02; D06M 13/188; D06M 15/227; D06M 15/263
USPC .................................... 428/220, 335; 442/79
See application file for complete search history.

(56) References Cited

U.S. PATENT DOCUMENTS

| 4,617,366 | A | | 10/1986 | Gloriod et al. | |
| 4,644,044 | A | | 2/1987 | Gloriod et al. | |
| 4,798,602 | A | * | 1/1989 | Laus | A61F 13/53418 428/500 |
| 4,878,974 | A | * | 11/1989 | Kagawa | 156/85 |
| 5,298,582 | A | | 3/1994 | Brusson et al. | |
| 5,869,414 | A | | 2/1999 | Fischer et al. | |
| 5,908,412 | A | * | 6/1999 | Koczab et al. | 604/367 |
| 5,959,055 | A | | 9/1999 | Le Blevec et al. | |
| 6,210,764 | B1 | * | 4/2001 | Hayes | B32B 27/20 428/34.9 |
| 6,322,801 | B1 | | 11/2001 | Lorenzi et al. | |
| 6,329,465 | B1 | * | 12/2001 | Takahashi et al. | 525/191 |
| 6,946,182 | B1 | * | 9/2005 | Allgeuer | B29C 43/222 264/134 |
| 2004/0029467 | A1 | * | 2/2004 | Lacroix | B32B 27/12 442/76 |
| 2005/0014431 | A1 | * | 1/2005 | Carmody | B32B 5/32 442/76 |
| 2006/0106145 | A1 | * | 5/2006 | Kennedy, III | A63B 37/0031 524/322 |
| 2006/0149004 | A1 | | 7/2006 | Lee et al. | |
| 2006/0189744 | A1 | * | 8/2006 | Tse | C08K 5/01 524/447 |
| 2007/0032614 | A1 | | 2/2007 | Goossens et al. | |
| 2007/0078223 | A1 | * | 4/2007 | Chen | B32B 27/32 525/191 |
| 2008/0269366 | A1 | * | 10/2008 | Shaffer | C08L 53/02 521/134 |
| 2009/0092816 | A1 | | 4/2009 | Flat et al. | |
| 2009/0142530 | A1 | * | 6/2009 | Visioli | C08L 23/0869 428/36.6 |
| 2009/0286906 | A1 | * | 11/2009 | Shi et al. | 524/47 |
| 2010/0273379 | A1 | * | 10/2010 | Chen | B32B 27/12 442/59 |

FOREIGN PATENT DOCUMENTS

| EP | 0327402 A2 | 8/1989 |
| EP | 0688826 A1 | 12/1995 |

(Continued)

OTHER PUBLICATIONS

Technical Data Sheet—Lotryl 20MA08; Jun. 2013; Arkema; whole document.*
Office Action (Notification under Article 94(3) EPC) dated Dec. 20, 2016 by the European Patent Office in corresponding European Application No. 11 719 331.8-1308. (10 pages).

*Primary Examiner* — Tahseen Khan
(74) *Attorney, Agent, or Firm* — Buchanan Ingersoll & Rooney P.C.

(57) ABSTRACT

An impervious breathable film made of a composition that does not include polymers having polyether units and includes one or more polymers, at least one of which is an ethylene copolymer. Said impervious breathable film is moreover made of a comonomer, having the function of an acid or one of the derivatives thereof. In said impervious breathable film, the weight of comonomers, having the function of carboxylic acid or a derivative of said acid, is greater than or equal to 21 wt % in said copolymer. Said impervious film moreover relates to a slip additive. The film has a thickness of 2 to 30 μm. Also, an impervious breathable structure, containing a fibrous material and said film, and moreover relates to a method for manufacturing said structure. Said film and said structure are advantageously usable as an impervious breathable material for, for example, construction siding.

10 Claims, No Drawings

(56) References Cited

FOREIGN PATENT DOCUMENTS

| EP | 0848019 | A1 | 6/1998 |
|---|---|---|---|
| EP | 1543952 | A2 | 6/2005 |
| FR | 2498609 | | 7/1982 |
| FR | 2569411 | | 2/1986 |
| FR | 2569412 | | 2/1986 |
| FR | 2660660 | A1 | 11/1991 |
| FR | 2897356 | A1 | 8/2007 |
| GB | 2091745 | | 8/1982 |
| WO | 0105588 | A1 | 1/2001 |
| WO | 2010124048 | A1 | 10/2010 |

* cited by examiner

IMPERVIOUS BREATHABLE ETHYLENE COPOLYMER FILM

FIELD OF THE INVENTION

The present invention relates to a waterproof-breathable film and a waterproof-breathable structure, that is to say a structure exhibiting a low permeability to liquid water but a high permeability to water in the vapour form.

In particular, this film and the structure have applications in the construction field, such as house wrapping, packaging, in the medical or health field and clothes.

STATE OF THE ART

These waterproof-breathable films can be used as is. However, for use as waterproof-breathable material, they are often applied to a support which is permeable to water vapour and which confers good mechanical properties on the waterproof-breathable structure. These supports are often manufactured from fibres made of synthetic polymer or from plant fibres, in the form of woven or non-woven materials.

There exist copolymers comprising polyamide blocks (in particular PA-11, PA-12 and PA-6 blocks) and polyether blocks (in particular polyoxyethylene glycol (PEG) blocks), sold in particular under the Pebax® name by Arkema, which have expanded in the markets of waterproof-breathable films. It is known, in particular by the document EP 0 688 826 on behalf of the Applicant Company, to obtain waterproof-breathable films from a blend comprising: a) at least one thermoplastic elastomer having polyether blocks and b) at least one copolymer of ethylene and of alkyl (meth)acrylate; these films can be used in combination with non-wovens or wovens and exhibit high permeabilities to water vapour (reaching, for blends with 60% by weight of the compound a), values of 22 000 g/m²/24 h according to Standard ASTM E96, method BW, for a film with thickness of 25 µm), a low water uptake and a good extrudability. However, the cost is high. Waterproof-breathable films having a thickness of 25 µm and composed of copolymer of ethylene and of methyl acrylate are also disclosed as comparative examples.

The document EP 0 848 019, on behalf of the Applicant Company, describes a copolymer of ethylene and of polyoxyalkylene glycol (meth)acrylic esters (the content of which can range up to 50% by weight). This copolymer is used to produce waterproof-breathable films having a permeability to water vapour not exceeding 10 000 g/m²/24 h according to Standard ASTM E96, method BW.

The document EP 1 543 952 describes various films of use as wall covering based on a cellulose non-woven and on a polymer composition comprising a polymer and a filler, this polymer being chosen from copolymers of ethylene and of alkyl (meth)acrylate, polyesters or copolyesters. This film is not used for house wrapping or to manufacture food films. Furthermore, the only copolymer of ethylene and of alkyl (meth)acrylate mentioned in the patent application is a copolymer comprising 20% by weight of methyl acrylate (Lotryl 20MA08 or Lotryl 20MB08). The waterproof-breathable properties of these films are still not entirely satisfactory and in particular these films can exhibit an inadequate permeability to water vapour.

Among the above documents, some disclose waterproof-breathable films comprising blends of copolymer of ethylene and of alkyl (meth)acrylate with copolymers comprising polyether units. However, these copolymers comprising polyether units are expensive; furthermore, the presence of these copolymers in the composition of the film makes it difficult to form thin films (for example, having a thickness of less than 25 µm). The price of these films can thus be relatively high.

Others are composed of copolymer of ethylene and of methyl acrylate having an amount by weight of methyl acrylate of 20%. However, these films exhibit inadequate waterproof-breathable properties.

Films with a thickness of 25 µm of copolymer of ethylene and of methyl acrylate having an amount of acrylate of 24% or 28% by weight have also been described. The Applicant Company has found that the films composed of these copolymers of ethylene and of acrylate having a content by weight of acrylate of more than 20% exhibit holes, due to the difficulty in processing them. This is even more true when these films are applied to supports made of fibrous materials, for example by extrusion-coating. In point of fact, the presence of these holes is damaging to the waterproof-breathable properties of the film, in particular the properties of impermeability to water.

There thus still exists a need to find novel waterproof-breathable films and structures which are inexpensive and which are manufactured by processes which are easy and/or which make possible increased productivity.

The document EP 0 327 402, which describes a composition composed of a blend of EPDM (ethylene/propylene/diene monomer), of EVA (ethylene/vinyl acetate), optionally polyethylene and a pore-forming agent (foaming agent), is also known. This composition and its process of preparation (by compression) result in a porous film which has absolutely no waterproof-breathable properties.

Finally, the document WO 2010/124048, which describes a composition systematically comprising ionomers (the addition of carboxylic acids being intended to participate in the formulation of the ionomer), is known.

SUMMARY OF THE INVENTION

Following its research, the Applicant Company has found, surprisingly, that a film not comprising polymer carrying polyether units but comprising a specific copolymer of ethylene and of a comonomer carrying a carboxylic acid functional group or a derivative of this acid and also a slip additive makes it possible to obtain entirely satisfactory waterproof-breathable properties.

A subject-matter of the present invention is thus a waterproof-breathable film formed by a composition not comprising polymer carrying polyether units and comprising one or more polymers, at least one of which is a copolymer of ethylene and of a comonomer carrying a carboxylic acid functional group or a derivative of this acid, characterized in that the amount by weight of comonomer carrying the carboxylic acid functional group or a derivative of this acid in the said copolymer is greater than or equal to 21%, for example from 21 to 40%, preferably from 23 to 30%, and in that it comprises a slip agent, the film having a thickness ranging from 2 to 30 µm, preferably from 5 to 24 µm, for example from 10 to 20 µm.

These waterproof-breathable films are inexpensive. The mechanical and adhesive properties of the composition forming the film make it possible to easily manufacture this film, without tears or the presence of holes, and also make possible structures comprising the said film on a fibrous support.

The waterproof-breathable properties can be easily chosen by selecting the thickness of a film, for example by increasing the thickness if it is desired to reduce the permeability to water vapour.

Furthermore, the process for the manufacture of these structures can be carried out by extrusion-coating at a faster manufacturing speed than the structures comprising a film based on elastomer comprising polyether blocks.

These films have waterproof-breathable properties particularly suited to use for house wrapping or packaging.

A slip agent is an agent which makes it possible to lubricate the surface of a polymer composition.

For example, the slip agent is chosen from fatty acids comprising from 8 to 80 carbon atoms and their derivatives comprising from 8 to 80 carbon atoms, such as the salts, esters or amides, or one of their mixtures. Preferably, the slip agent is chosen from erucamide, oleamide, stearamide, behenamide, oleylpalmitamide, stearylerucamide, N,N'-ethylenebis(stearamide) and ethylenebisoleamide.

Advantageously, the amount by weight of slip additive is within the range extending from 500 to 50 000 ppm, with respect to the total weight of the composition, preferably from 1000 to 10 000 ppm.

The composition advantageously comprises a siliceous additive, other than the slip agent, chosen, for example, from silicas, zeolites and talcs. Preferably, the amount by weight of siliceous additive is within the range extending from 500 to 100 000 ppm, with respect to the total weight of the composition, preferably from 1000 to 50 000 ppm.

Preferably, the comonomer carries a functional group of a carboxylic acid derivative and is chosen from carboxylic acid vinyl esters, such as vinyl acetate, and alkyl (meth)acrylates, the alkyl chain of which comprises from 1 to 20 carbon atoms, such as methyl acrylate.

Preferably, the amount by weight of copolymer of ethylene and of comonomer carrying the carboxylic acid functional group or one of its derivatives is within the range extending from 80 to 100% of the total weight of polymer in the composition. Thus, the polymer can be composed solely of copolymer of ethylene and of comonomer carrying the carboxylic acid functional group or a derivative of this acid.

The waterproof-breathable properties of these films are particularly advantageous, particularly for use for house wrapping. For an equivalent permeability to water vapour, these films are much thinner than the waterproof-breathable films generally used, while remaining impermeable to water in the liquid form.

Advantageously, the copolymer of ethylene and of the comonomer carrying a carboxylic acid functional group or a derivative of this acid is manufactured by a high pressure radical polymerization process in an autoclave reactor.

This copolymer has excellent properties in the molten state which make it possible, for example, to improve the application to a support.

Advantageously, the film is made from a composition exhibiting, when it is in the form of a film with a thickness of 25 μm, a permeability to water vapour included within the range extending from 35 to 120 g/m²/24 h using Standard ASTM E96 method A (23° C., 50% relative humidity).

The invention thus also relates to a structure comprising a film according to the invention and also a support comprising a fibrous material, preferably of non-woven or woven type. These fibres can comprise a synthetic polymer and/or natural fibres. Mention may be made, without implied limitation, of a polyolefin non-woven, a polyolefin woven or paper.

The aforesaid structure can be manufactured by a process by extrusion-coating. Preferably, the film is coated onto the support. The speed of the said support during extrusion can be between 50 and 300 m/min.

Another subject-matter of the invention is use of the film or of the structure according to the invention as waterproof-breathable material, in particular for house wrapping or packaging.

DETAILED DESCRIPTION OF THE INVENTION

A first subject-matter of the invention is a waterproof-breathable film with a composition comprising a copolymer of ethylene and of a comonomer carrying a carboxylic acid functional group or a derivative of this acid, in which the amount by weight of comonomer in the said copolymer is greater than or equal to 21%.

A comonomer is a monomer capable of reacting with ethylene to form a copolymer. Mention may be made, as examples of comonomer carrying an acid functional group or one of its derivatives, of:

unsaturated carboxylic acids, such as acrylic acid or methacrylic acid;

unsaturated carboxylic acid anhydrides or unsaturated dicarboxylic acid anhydrides, such as maleic anhydride;

alkyl acrylates and alkyl methacrylates combined under the term alkyl (meth)acrylates. The alkyl chains of these (meth)acrylates can have up to 20 carbon atoms and can be linear or branched. Mention may be made, as alkyl chains, of methyl, ethyl, propyl, n-butyl, sec-butyl, isobutyl, tert-butyl, pentyl, hexyl, heptyl, octyl, 2-ethylhexyl, nonyl, decyl, undecyl, dodecyl, tridecyl, tetradecyl, pentadecyl, hexadecyl, heptadecyl, octadecyl, nonadecyl or eicosyl. Preference is given to methyl (meth)acrylate as alkyl (meth)acrylate;

carboxylic acid vinyl esters. Mention may be made, as examples of carboxylic acid vinyl esters, of vinyl acetate, vinyl versatate, vinyl propionate, vinyl butyrate or vinyl maleate. Preference is given to vinyl acetate as carboxylic acid vinyl ester.

Preferably, the comonomer carrying an acid functional group is an alkyl (meth)acrylate.

The copolymer can comprise at least 2 comonomers carrying an acid functional group or one of its derivatives.

The copolymer can additionally comprise another comonomer capable of reacting with ethylene and with the comonomer(s) carrying a carboxylic acid functional group or a derivative of this acid. The copolymer comprises an amount of greater than or equal to 21% by weight of comonomer carrying a carboxylic acid functional group or a derivative of this acid. The amounts of the various monomers present in the various polymers of the invention can be measured by infrared spectroscopy, for example using the method described in Standard ISO8985.

Such copolymers are sold by the Applicant Company under the Evatane® trade name (copolymer of ethylene and of vinyl acetate) and Lotryl® trade name (copolymer of ethylene and of alkyl acrylate).

These copolymers can be manufactured by radical polymerization, for example at high pressure. Industrially, these copolymers are manufactured using two types of different reactors: reactors of "autoclave" type and reactors of "tubular" type. These copolymerization processes are, for example, those described in Patent Applications FR 2 660 660, FR 2 498 609, FR 2 569 411, FR 2 569 412, US2006/

0149004 A1 and US2007/0032614 A1. An "autoclave copolymer" and a "tubular copolymer" are obtained respectively. The properties for the 2 copolymers obtained are different. Without being committed to any one theory, these different properties can be explained by differences in branching and in distribution of the comonomers in the polymer chain. This in particular brings about a difference in melting point of the polymer for a copolymer obtained from the same monomers in an autoclave reactor or in a tubular reactor. Preferably, the copolymer is obtained using an autoclave reactor, which makes possible easier application to a support than a copolymer with the same composition obtained using a tubular reactor. Preferably, the copolymer exerts a melting point of less than or equal to 85° C., preferably ranging from 50 to 80° C., for example from 55 to 75° C. For example, this temperature can be measured by DSC according to Standard ISO 11357-1:2009.

The composition used to form the film according to the invention can additionally comprise another polymer, such as polyolefins. Mention may be made, as examples of polyolefin, of homopolymers of ethylene or copolymers of ethylene with a second olefin, such as 1-butene, 1-hexene or 1-octene.

Preferably, the composition comprises from 80 to 100% by weight of copolymer of ethylene and of a comonomer carrying a carboxylic acid functional group or a derivative of this acid, with respect to the total weight of polymer in the composition. According to one embodiment, the polymer of the combination is composed of the said copolymer.

The composition forming the film additionally comprises a slip agent.

It can be chosen from fatty acids comprising from 8 to 80 carbon atoms and their derivatives comprising from 8 to 80 carbon atoms, such as salts, esters or amides, or one of their mixtures. Mention may be made, as examples of carboxylic acid, of stearic acid, oleic acid or erucic acid. Mention may be made, as carboxylic acid salt, of aluminium stearate or zinc stearate. Use may be made, as fatty acid ester, of methyl stearate or ethyl stearate. Preferably, the slip agent is a fatty acid amide. It can be chosen from erucamide, oleamide, stearamide, behenamide, oleylpalmitamide, stearylerucamide, N,N'-ethylenebis(stearamide) and ethylenebisoleamide. The composition can comprise a mixture of these slip agents.

The composition can additionally comprise a siliceous additive which is chosen from silica, zeolites and talc. These additives can be modified at the surface via a treatment. These siliceous additives can have a particle size ranging from several nanometres to a few microns.

The composition can additionally comprise other additives which make it possible to improve one of the properties of the polymer, such as a plasticizer, an antioxidant, a UV stabilizer, a flame retardant or a mould-release agent.

The composition of the film according to the invention can be manufactured by mixing its various constituents by conventional means for processing thermoplastic, such as, for example, extrusion or kneading. Use may be made of internal blade or rotor mixers, an external mixer, or single-screw or corotating or counterrotating twin-screw extruders. The processing temperature can be from 80 to 300° C.

The film according to the invention preferably exhibits a thickness ranging from 2 to 30 µm, preferably from 5 to 24 µm, for example from 10 to 20 µm. Preferably, the film comprises fewer than 10 holes per m² of film. Very preferably, the film exhibits an absence of holes.

The waterproof-breathable properties of the film are measured by measuring in particular the permeability to water vapour. This depends on the thickness of the film evaluated and on the operating conditions, that is to say on the configuration, the temperature and the humidity conditions of the test. Preferably, the film is made from a composition exhibiting a permeability to water vapour included within the range extending from 35 to 120 g/m²/24 h when it is in the form of a film with a thickness of 25 µm, using Standard ASTM E96 method A (23° C., 50% relative humidity). Advantageously, the film exhibits an impermeability to water in the liquid form, measured by the water column test according to Standard NF EN 20811 of more than 1 m.

Use may be made, to form the film according to the invention, of a press or a flat extruder having a film die (of cast type). Use may also be made of a continuous process in which the composition and immediately the film are formed, for example using an extruder of cast type.

Another subject matter of the invention is a structure comprising a film according to the invention on a support made of fibrous material.

A fibrous support is a non-continuous support which allows water to pass in the liquid and vapour form. This support made of fibrous material is preferably a woven or a non-woven. This fibrous material can be manufactured from synthetic polymer, such as polyolefins, polyester or polyamide. It can also be manufactured from natural fibre, such as cotton, flax or cellulose. Non-wovens made of polypropylene or paper or wovens made of cotton may thus be involved.

The structure can be manufactured by applying the film, manufactured beforehand, to a support and by assembling it, for example by pressing.

According to a highly advantageous form of the invention, the structure according to the invention is manufactured by a process of extrusion-coating of the film of the composition on the support. One of the advantages of the composition used in the present invention is that it makes possible its coating on the support in the form of a thin film, for example having a thickness of less than 30 µm, the said film exhibiting a lower number of holes than the films with the same thickness of the prior art, even using speeds of the extrusion line (forward progression of the support) of between 50 and 300 m/min.

The invention thus relates to a process for the manufacture of a structure according to the invention by extrusion-coating of the film according to the invention on a support made of fibrous material. Preferably, the speed of the extrusion line is between 50 and 300 m/min.

The invention claimed is:

1. Waterproof-breathable film of a composition not comprising any polymer carrying polyether units and comprising one or more polymers, at least one of which is a copolymer of ethylene and of a comonomer carrying a carboxylic acid functional group or one of its derivatives, in which the amount by weight of comonomer carrying the carboxylic acid functional group or a derivative of this acid in the said copolymer is greater than or equal to 23%, and also a slip additive, a siliceous additive selected from the group consisting of silicas, zeolites and talcs;
optionally, an additive selected from the group consisting of plasticizers, antioxidants, UV stabilizers, flame retardants and mold release agents; and
wherein the film, at a thickness of 25 µm, has a permeability to water vapour within the range extending from 35 to 120 g/m²/24 h, using Standard ASTM E96, method A (23° C., 50% relative humidity); and wherein an amount by weight of the copolymer of the ethylene and the comonomer is within a range extending from 80 to 100% of total weight of polymer in the composition.

2. Film according to claim 1, wherein an amount by weight of the slip additive is within a range extending from 500 to 50 000 ppm, with respect to a total weight of the composition.

3. Film according to claim 1, wherein an amount by weight of the siliceous additive is within a range extending from 500 to 100 000 ppm, with respect to a total weight of the composition.

4. Film according to claim 1, wherein the comonomer carries a functional group of a carboxylic acid derivative and is chosen from carboxylic acid vinyl esters, and alkyl (meth)acrylates, the alkyl chain of which comprises from 1 to 20 carbon atoms.

5. Film according to claim 1, wherein the copolymer of ethylene and of the comonomer carrying a carboxylic acid functional group or a derivative of this acid is manufactured by a high-pressure radical polymerization process in an autoclave reactor.

6. Waterproof-breathable film of a composition not comprising any polymer carrying polyether units and comprising one or more polymers, at least one of which is a copolymer of ethylene and of a comonomer carrying a carboxylic acid functional group or one of its derivatives, in which the amount by weight of comonomer carrying the carboxylic acid functional group or a derivative of this acid in the said copolymer is greater than or equal to 23%, and also a slip additive, the film having a thickness ranging from 2 to 30 µm, wherein the film, at a thickness of 25 µm, has a permeability to water vapour within the range extending from 35 to 120 g/m$^2$/24 h, using Standard ASTM E96, method A (23° C., 50% relative humidity); and wherein an amount by weight of the copolymer of the ethylene and the comonomer is within a range extending from 80 to 100% of total weight of polymer in the composition.

7. Film according to claim 1, wherein the film has a thickness ranging from 2 to 30 µm and wherein the slip additive is selected from the group consisting of fatty acids comprising from 8 to 80 carbon atoms and their derivatives comprising from 8 to 80 carbon atoms.

8. Film according to claim 6, wherein the film is non-porous; and wherein the slip additive is selected from the group consisting of fatty acids comprising from 8 to 80 carbon atoms and their derivatives comprising from 8 to 80 carbon atoms.

9. Film according to claim 1, wherein the slip agent is chosen from erucamide, oleamide, stearamide, behenamide, oleylpalmitamide, stearylerucamide, N,N'-ethylenebis (stearamide) and ethylenebisoleamide.

10. Film according to claim 6, wherein the slip agent is chosen from erucamide, oleamide, stearamide, behenamide, oleylpalmitamide, stearylerucamide, N,N'-ethylenebis (stearamide) and ethylenebisoleamide.

* * * * *